(12) United States Patent
Braun et al.

(10) Patent No.: US 10,457,766 B2
(45) Date of Patent: Oct. 29, 2019

(54) LONG-CHAIN BRANCHED POLYPROPYLENE FOR FILM APPLICATION

(71) Applicant: Borealis AG, Vienna (AT)

(72) Inventors: Hermann Braun, Linz (AT); Jingbo Wang, Linz (AT); Markus Gahleitner, Neuhofen/Krems (AT); Hermann Prokschi, Wartberg ob der Aist (AT); Johanna Lilja, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/522,622

(22) PCT Filed: Nov. 4, 2015

(86) PCT No.: PCT/EP2015/075684
§ 371 (c)(1),
(2) Date: Apr. 27, 2017

(87) PCT Pub. No.: WO2016/071388
PCT Pub. Date: May 12, 2016

(65) Prior Publication Data
US 2017/0320986 A1    Nov. 9, 2017

(30) Foreign Application Priority Data
Nov. 5, 2014 (EP) .................................. 14191801

(51) Int. Cl.
*C08F 255/02* (2006.01)
*C08F 255/04* (2006.01)
*C08K 5/00* (2006.01)

(52) U.S. Cl.
CPC .......... *C08F 255/02* (2013.01); *C08F 255/04* (2013.01); *C08K 5/0008* (2013.01)

(58) Field of Classification Search
CPC .... C08K 5/0008; C08F 255/02; C08F 255/04; C08F 10/06; C08F 4/651
See application file for complete search history.

(56) References Cited

U.S. PATENT DOCUMENTS

2012/0295994 A1* 11/2012 Bernreitner ................ C08J 5/18
                                                                    521/81
2014/0357477 A1* 12/2014 Denifl ...................... C08F 10/06
                                                                    502/107
2014/0357816 A1* 12/2014 Virkkunen ............. C08F 210/06
                                                                    526/123.1

FOREIGN PATENT DOCUMENTS

| CN | 104039842 A | 9/2014 |
| CN | 104039845 A | 9/2014 |
| EP | 2520425 A1 | 11/2012 |
| EP | 2338930 A1 | 7/2013 |
| EP | 2610271 A1 | 7/2013 |
| EP | 2610272 A1 | 7/2013 |
| JP | 2010001420 A | 1/2010 |
| JP | 2014503652 A | 2/2014 |
| JP | 2015-503647 A | 2/2015 |
| JP | 2015506391 A | 3/2015 |
| JP | 2015522701 A | 8/2015 |
| WO | 2012/007430 A1 | 1/2012 |
| WO | 2012/087531 A1 | 6/2012 |
| WO | 2013/098149 | 7/2013 |
| WO | 2013/098150 A1 | 7/2013 |
| WO | 2014/016205 A1 | 1/2014 |
| WO | 2014/016206 A1 | 1/2014 |
| WO | 2014001394 A1 | 1/2014 |
| WO | 2014/206950 A1 | 12/2014 |

OTHER PUBLICATIONS

Extended European Search Report for Application No. 14191801.1-1302, dated Sep. 2, 2015.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.
Kakugo, M., et al., "13C NMR Determination of Monomer Sequence Distribution in Ethylene-Propylene Copolymers Prepared with δ-TiC13-Al( C2H5%) Cl", Macromolecules 1982, pp. 1150-1152.
Resconi, L., et al., "Selectivity in Propene Polymerization with Metallocene Catalysts", Chem. Rev. 2000, pp. 1253-1345.
Cheng, H. N., "13C MNR Analysis of Ethylene-Propylene Rubber" Macromolecules 194, pp. 1950-1955.
Zhou, Z., et al., "A new decoupling method for accurate quantification of polyethylene copolymer composition and triad sequence distribution with 13C NMR", Journal of Magnetic Resonance, (2007), pp. 225-233.
Singh, G., "Triad sequence determination of ethylene-propylene copolymers—application of quantitative 13C NMR", Polymer Testing, (2009) pp. 475-479.
Wagner, M.H., "Rheotens-Mastercurves and Drawability of Ploymer Melts", Polymer Engineering and Science, 1996, vol. 36, pp. 925-935.
Wang, WJ., et al., Structural Analysis of Ethylene/Propylene Copolymers Synthesized with a Constrained Geometry Catalyst, Macromolecules 2000, pp. 1157-1162.

(Continued)

*Primary Examiner* — Peter D. Mulcahy
(74) *Attorney, Agent, or Firm* — Tarolli, Sundheim, Covell & Tummino LLP

(57) ABSTRACT

The invention relates to a propylene homopolymer or copolymer having a comonomer in the copolymer selected from ethylene, $C_4$-$C_{20}$-alpha olefin, said propylene homopolymer or copolymer being free of phthalic compound. It further relates to a long-chain branched propylene homopolymer or copolymer (b-PP) having a comonomer in the copolymer selected from ethylene, $C_4$-$C_{20}$-alpha olefins, said long-chain branched propylene homopolymer or copolymer (b-PP) being free of phthalic compound. As well as their production processes and uses.

5 Claims, No Drawings

(56) References Cited

OTHER PUBLICATIONS

Taiwan Office Action for Application No. 104135576.
Japanese Office Action dated Apr. 10, 2018.
Chinese Office Action dated Jan. 23, 2019.

\* cited by examiner

LONG-CHAIN BRANCHED POLYPROPYLENE FOR FILM APPLICATION

The present invention relates to a specific propylene homopolymer or copolymer and a process for its production. It further relates to a polypropylene composition comprising the propylene homopolymer and/or copolymer as well as a process for making such composition. The invention also relates to a long-chain branched propylene homopolymer or copolymer, its production by means of a reactive modification process, its use, an article made from such long-chain branched propylene homopolymer and/or copolymer and a melt state transformation process for producing such article. Even further it relates to a long-chain branched polypropylene composition comprising a long-chain branched propylene homopolymer and/or copolymer, its preparation process, its use, an article made from such long-chain branched polypropylene composition as well as a melt state transformation process for producing such article.

Propylene homopolymers and copolymers are suitable for many applications such as packaging, textile, automotive, laboratory equipment and pipe. In the field of packaging, these polymers are suitable for film preparation because they present a variety of properties including good stiffness and toughness, high transparency, good sealing, good surface gloss and they are sterilisable. However, it is also known that polypropylene materials exhibit a series of disadvantages during thermoplastic processing, such as an increased instability of the melt and the therewith associated smaller processing window related to process output, bubble stability and downgauging. Therefore it is necessary to improve the melt strength of the polypropylene.

This objective can be reached by subjecting the polypropylene to a post-reactor modification process such as high melt strength (HMS) process. This process generates branching in the polypropylene material resulting in long-chain branched propylene polymer. The long-chain branching is generally associated with improved melt-strength. These long-chain branched polypropylenes are therefore often used for making films.

A challenge within the field of existing long-chain branched polypropylenes and their compositions is that the resulting films produced from them present some quality issues such as unsatisfactory appearance and weak mechanical properties spots due to the presence of gels in the films. The film quality can be expressed via a so-called "gel index". A high gel index stands for a high number of gels and thus an unsatisfactory appearance and poor mechanical performance of a film made from a polymer with a high gel index. Thus there is a wish to decrease the gel index in this kind of films. The gel index is measured with an Optical Control System (OCS) gel inspection tool.

WO 2014/001394 describes a high melt strength (HMS) post-reactor modification process wherein peroxide and butadiene are used to make long-chain branched polypropylene (b-PP) materials. The long-chain branched polypropylenes in WO 2014/001394 are used to prepare films with reduced gel index. For the final preparation of the long-chain branched polypropylene compositions in WO 2014/001394 at the end an additive mixture is dosed in the HMS process. The additive mixture is dosed as a masterbatch, which means that the additives are dispersed in a polymer matrix, in this case in a specific polypropylene powder. The gel index reduction in the long-chain branched polypropylene compositions and their films can be achieved by increasing the MFR of the polypropylene powder used in the additive mixture masterbatch. Some of the disadvantages of this method are the limitation of the additivation process by means of a masterbatch and the limited choice of additives because such additives should be able to disperse in the specific polypropylene powder. Further it is a limitation to reach the desired final MFR of the long-chain branched polypropylene composition and it is difficult to produce long-chain branched polypropylene with a reduced gel index being free of additives. Therefore there is a need to find better ways to improve the quality of the long-chain branched polypropylene material, more specifically the gel index.

Polypropylene material suitable for use in the preparation of long-chain branched polypropylene, hereinafter sometimes also referred to as (b-PP), can be produced using a Ziegler-Natta catalyst. This type of catalyst generally contains an internal electron donor. The most commonly used type of internal electron donor in a Ziegler-Natta type catalyst is a phthalate based compound. Nowadays phthalate based compounds are sometimes considered to be disadvantageous in view of health and environmental issues. Therefore there exists a need to find suitable alternatives for polypropylene materials containing phthalates, while still having the same as or even improved properties over the prior art.

Thus there is a need for a polypropylene material suitable for an HMS process which results in an improved quality of the long-chain branched polypropylene obtained while at the same time fulfilling future environmental and health requirements. This need is being fulfilled by producing the polypropylene in the presence of a catalyst system free of phthalates. By using such a catalyst system it is possible to produce long-chain branched polypropylene free of phthalates, while also reaching the desired mechanical properties.

The above mentioned disadvantages of unsatisfactory film quality, high gel index and presence of phthalates have been overcome by providing a propylene homopolymer or copolymer having a comonomer in the copolymer selected from ethylene, $C_4$-$C_{20}$-alpha olefin, and any combination thereof, with a comonomer content in the copolymer in the range of 0.1 to 7.0 wt %, a xylene cold soluble (XCS) content in the range of 0.8 to 15.0 wt %, an $MFR_2$ in the range of 1.50 to 10.0 g/10 min, where $MFR_2$ is the melt flow rate measured according to ISO 1133 at 230° C. and a load of 2.16 kg, said propylene homopolymer or copolymer characterized in that:

a) the porosity is higher than 8.0%,
b) the median particle size d50 is in the range of 150 to 1500 μm,
c) the top-cut particle size d95 is in the range of 500 to 4000 μm,
d) said propylene homopolymer or copolymer is free of phthalic compound.

This material will, hereinafter, sometimes also be referred to as (PP-A).

The propylene homopolymer or copolymer according to the invention (PP-A) can be a suitable material for use in an HMS process for the production of long-chain branched polypropylene, long-chain branched polypropylene compositions and films having a low gel index made therefrom.

Propylene copolymers which are free of catalyst originating phthalate are described in WO 2013/098150. Although WO 2013/098150 describes phthalate free propylene copolymers, the features and application of such materials are focused to the field of pipes and not to film. Further, particle size and particle size distribution relating to the resulting polymer are not disclosed in this document.

DESCRIPTION OF THE INVENTION

The present invention provides a propylene homopolymer or copolymer having a comonomer in the copolymer selected from ethylene, $C_4$-$C_{20}$-alpha olefin and any combination thereof, with a comonomer content in the copolymer in the range of 0.1 to 7.0 wt %, a xylene cold soluble (XCS) content in the range of 0.8 to 15.0 wt %, an $MFR_2$ in the range of 1.50 to 10.0 g/10 min, where $MFR_2$ is the melt flow rate measured according to ISO 1133 at 230° C. and a load of 2.16 kg, said propylene homopolymer or copolymer characterized in that:

a) the porosity is higher than 8.0%,
b) the median particle size d50 is in the range of 150 to 1500 μm,
c) the top-cut particle size d95 is in the range of 500 to 4000 μm and
d) said propylene homopolymer or copolymer is free of phthalic compound.

According to the present invention the term "phthalic compound" refers to phthalic acid (CAS No. 88-99-3), its mono- and diesters with aliphatic, alicyclic and aromatic alcohols as well as phthalic anhydride.

According to the present invention the expression "propylene homopolymer" relates to a polypropylene that consists substantially, i.e. of at least 99.0 wt %, more preferably of at least 99.5 wt %, still more preferably of at least 99.8 wt %, like at least 99.9 wt % of propylene units. In another embodiment only propylene units are detectable, i.e. only propylene has been polymerized.

According to the present invention, the expression "propylene copolymer" relates to a copolymer comprising units derived from propylene and at least one comonomer selected from ethylene and $C_4$-$C_{20}$ alpha-olefins, preferably ethylene or at least a $C_4$-$C_{10}$ alpha-olefin. Accordingly the propylene copolymer comprises units derived from propylene and at least one linear or branched comonomer selected from the group consisting of ethylene, $C_4$-alpha-olefin, $C_5$-alpha-olefin, $C_6$-alpha-olefin, $C_7$-alpha-olefin, $C_8$-alpha-olefin, $C_9$-alpha-olefin and $C_{10}$-alpha-olefin. More preferably the propylene copolymer comprises units derived from propylene and at least one comonomer selected from ethylene or linear $C_4$-$C_{10}$ alpha-olefin, more preferably selected from ethylene, 1-butene, 1-pentene, 1-hexene, 1-heptene, 1-octene, 1-nonene and 1-decene, wherein ethylene, 1-butene and 1-hexene are preferred. It is particularly preferred that the propylene copolymer consists of units derived from propylene and ethylene.

The amount of units derived from ethylene and/or $C_4$-$C_{20}$ alpha-olefins other than propylene in the propylene copolymer is in the range of 0.1 to 7.0 wt %, preferably in the range of 0.3 to 6.5 wt %, more preferably in the range of 0.4 to 6.0 wt %. A suitable lower limit can be 0.1 wt %, preferably 0.3 wt %, more preferably 0.4 wt %. A suitable upper limit can be 7.0 wt %, preferably 6.5 wt %, more preferably 6.0 wt %. The lower and upper indicated values of the ranges are included.

In a preferred embodiment the propylene copolymer is a propylene random copolymer and the units derived from ethylene and/or $C_4$-$C_{20}$ alpha-olefins within the propylene copolymer are randomly distributed. The propylene copolymer should thus have a relative content of isolated to block ethylene sequences (I(E)) in the range of 45.0 to 69.0%. More preferably, the relative content of isolated to block ethylene sequences (I(E)) will be in the range of 50.0 to 68.0%, like in the range of 52.0 to 67.0%. The I(E) content is defined by equation (I):

$$I(E) = \frac{fPEP}{(fEEE + fPEE + fPEP)} \times 100 \quad (I)$$

Wherein:
I(E) is the relative content of isolated to block ethylene sequences [in %];
fPEP is the mole fraction of propylene/ethylene/propylene sequences (PEP) in the sample;
fPEE is the mole fraction of propylene/ethylene/ethylene sequences (PEE) and of ethylene/ethylene/propylene sequences (EEP) in the sample;
fEEE is the mole fraction of ethylene/ethylene/ethylene sequences (EEE) in the sample.

All sequence concentrations are based on a statistical triad analysis of $^{13}$C-NMR data.

According to the invention the propylene homopolymer or copolymer has a xylene cold soluble (XCS) fraction measured according to ISO 16152 (25° C.) in the range of 0.8 to 15.0 wt %, preferably in the range of 1.0 to 13.0 wt %, more preferably in the range of 1.5 to 12.0 wt %. A suitable lower limit can be 0.8 wt %, preferably 1.0 wt %, more preferably 1.5 wt %. A suitable upper limit can be 15.0 wt %, preferably 13.0 wt %, more preferably 12.0 wt %. The lower and upper indicated values of the ranges are included.

Generally the melt flow rate ($MFR_2$) for the inventive propylene homopolymer or copolymer is between 1.5 and 10.0 g/10 min. The $MFR_2$ for the propylene homopolymer or copolymer is determined according to ISO 1133, at a temperature of 230° C. and under a load of 2.16 kg. Irrespective of the exact nature of the propylene homopolymer or copolymer it is preferred that the MFR is between 2.0 and 9.0 g/10 min, more preferably the MFR is between 2.5 and 8.0 g/10 min. A suitable lower limit can be 1.5 g/10 min, preferably 2.0 g/10 min, more preferably 2.5 g/10 min. A suitable upper limit can be 10.0 g/10 min, preferably 9.0 g/10 min, more preferably 8.0 g/10 min. The lower and upper indicated values of the ranges are included.

The porosity and the specific pore volume of the inventive propylene homopolymer or copolymer are measured by mercury porosimetry according to DIN 66133 in combination with helium density measurement according to DIN 66137-2. The porosity is calculated by equation (II) as follows:

$$\text{Porosity [\%]} = \left[ \frac{\text{specific pore volume}}{\left(\text{specific pore volume} + \frac{1}{\text{density}}\right)} \right] * 100 \quad (II)$$

The porosity of the inventive propylene homopolymer or copolymer is higher than 8.0%, preferably in the range of 8.5 to 14.0%, more preferably in the range of 9.0 to 13.0%. The specific pore volume of the inventive propylene homopolymer or copolymer is generally higher than 0.10 cm$^3$/g, preferably in the range of 0.11 to 0.22 cm$^3$/g, more preferably in the range of 0.12 to 0.20 cm$^3$/g.

According to the invention, the median particle size d50 and the top-cut particle size d95 of the propylene homopolymer or copolymer are measured by sieve analysis according to ISO 3310 and evaluated according to ISO 9276-2. The median particle size d50 is in the range of 150 to 1500 μm, preferably in the range of 200 to 1300 μm and more preferably in the range of 250 to 1200 μm. The top-cut particle size d95 is in the range of 500 to 4000 μm, preferably in the range of 600 to 3500 μm, more preferably in the range of 550 to 3000 μm.

In a second embodiment of the invention the propylene homopolymer or copolymer according to the invention, is produced in a polymerization process in the presence of a catalyst system comprising: a) a Ziegler-Natta based catalyst with a transition metal of Group 4 to 6 (TM), the catalyst containing an internal donor, b) optionally a co-catalyst (Co), c) optionally an external donor (ED) and wherein if present, the co-catalyst (Co) to external donor (ED) molar ratio [Co/ED] is in the range of 3.0 to 45.0 mol/mol and wherein the co-catalyst (Co) to transition metal of Group 4 to 6 (TM) molar ratio [Co/TM] is in the range of 40.0 to 500 mol/mol; characterized in that the resulting propylene homopolymer or copolymer has:

a) a porosity of more than 8.0%, b) a median particle size d50 in the range of 150 to 1500 μm, c) a top-cut particle size d95 in the range of 500 to 4000 μm and wherein the internal donor comprised in the Ziegler-Natta catalyst (a) is a non-phthalic compound.

Generally the propylene homopolymer or copolymer produced will be in the form of a powder.

Preferably, said propylene homopolymer or copolymer powder is further characterized by a specific pore volume of more than 0.10 cm$^3$/g, even more preferably in the range of 0.11 to 0.22 cm$^3$/g, like in the range of 0.12 to 0.20 cm$^3$/g.

The propylene homopolymers or copolymers according to both embodiments described above can be unimodal or multimodal, in view of the molecular weight distribution and/or in view of the comonomer content distribution in the case of the propylene copolymer.

When the propylene homopolymer or copolymer is unimodal with respect to the molecular weight distribution and/or comonomer content, it may be prepared in a single stage process e.g. as slurry or gas phase process in respectively a slurry or gas phase reactor.

Preferably, the unimodal propylene homopolymer or copolymer is prepared in a slurry reactor. Alternatively, the unimodal propylene homopolymer or copolymer may be produced in a multistage process using at each stage, process conditions which result in similar polymer properties.

The expression "multimodal" or "bimodal" used herein refers to the modality of the polymer, i.e.

the form of the homopolymer's or copolymer's molecular weight distribution curve, which is the graphical representation of the molecular weight fraction as a function of its molecular weight, or the form of the copolymer's comonomer content distribution curve, which is the graphical representation of the comonomer content as a function of the molecular weight of the polymer fractions.

As will be explained below, the polymer fractions of the propylene homopolymer or copolymer can be produced in a sequential step process, using reactors in serial configuration and operating at different reaction conditions. As a consequence, each fraction prepared in a specific reactor can have its own molecular weight distribution and/or comonomer content distribution depending on the type of propylene polymer produced (propylene homopolymer or copolymer). When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps. Accordingly the propylene homopolymer or copolymer may be multimodal, like bimodal, in view of the molecular weight and/or comonomer content depending on the type of propylene polymer produced (propylene homopolymer or copolymer).

In case the propylene copolymer is of multimodal, like bimodal, character, in view of the comonomer content, it is appreciated that the individual fractions are present in amounts influencing the properties of the material. Accordingly it is appreciated that each of these fractions is present in an amount of at least 10 wt % based on the propylene copolymer. Accordingly in case of a bimodal system, in particular in view of the comonomer content, the split of the two fractions is preferably 40:60 to 60:40, like roughly 50:50.

Polymerisation processes which are suitable for producing the propylene homopolymer or copolymer of the present invention are known in the state of the art and comprise at least one polymerisation stage, where polymerisation is typically carried out in solution, slurry, bulk or gas phase. Typically the polymerisation process comprises additional polymerisation stages or reactors. In one particular embodiment the process contains at least one bulk reactor zone and at least one gas phase reactor zone, each zone comprising at least one reactor and all reactors being arranged in cascade. In one particularly preferred embodiment the polymerisation process comprises at least one bulk reactor and at least one gas phase reactor arranged in that order. In some preferred processes the process comprises one bulk reactor and at least two, e.g. two or three gas phase reactors. The process may further comprise pre- and post-reactors. Pre-reactors comprise typically pre-polymerisation reactors. In this kind of processes the use of higher polymerisation temperatures is preferred in order to achieve specific properties of the polymer. Typical temperatures in these processes are 70° C. or higher, preferably 80° C. or higher, even 85° C. or higher. The higher polymerisation temperatures as mentioned above can be applied in some or all reactors of the reactor cascade.

According to the second embodiment of the invention a specific type of Ziegler-Natta catalysts is used. It is essential that the internal donor is a non-phthalic compound. Preferably through the whole catalyst preparation no phthalate compounds are used thus the final catalyst does not contain any phthalic compound. Therefore the propylene homopolymers or copolymers are free of phthalic compounds.

The catalyst used in the present invention belongs to the group of Ziegler-Natta catalyst. Generally these catalysts comprise one or more compounds of a transition metal of Group 4 to 6 as defined in IUPAC version 2013, like titanium, further a Group 2 metal compound, like a magnesium compound and an internal donor (ID). In the present invention the internal donor (ID) is chosen to be a non-phthalic compound, in this way the catalyst is fully free of undesired phthalic compounds. Further the solid catalyst is preferable free of any external support material, like silica or MgCl$_2$, and thus the catalyst is self-supported.

The solid catalyst is obtainable by the following general procedure:

a) providing a solution of a$_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or a₂) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or a₃) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or a₄) Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is a Group 2 metal, X is halogen, $R_1$ and $R_2$ are different alkyl groups of 2 to 16 carbon atoms, and $0 \leq n < 2$, $0 \leq m < 2$ and $n+m+(2-n-m)=2$, provided that n and m are not 0 simultaneously, $0 < n' \leq 2$ and $0 < m' \leq 2$; and b) adding said solution from step a) to at least one compound of a transition metal of Group 4 to 6 and c) obtaining the solid catalyst component particles, and adding a non-phthalic internal electron donor (ID) at least in one step prior to step c).

The internal donor (ID) or precursor thereof is added preferably to the solution of step a) or to the transition metal compound before adding the solution of step a).

According to the procedure above the solid catalyst can be obtained via a precipitation method or via an emulsion—solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of a₂) or a₃) is used, i.e. a solution of (Ax') or a solution of a mixture of (Ax) and (Bx).

Preferably the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched $C_2$-$C_{16}$ alkyl residue, preferably a $C_4$ to $C_{10}$ alkyl residue, more preferably a $C_6$ to $C_8$ alkyl residue. The most preferred monohydric alcohol is 2-ethyl-1-hexanol or octanol.

Preferably a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different $C_1$-$C_{20}$ alkyl groups, preferably $C_2$-$C_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that the magnesium compound reacts in addition to the alcohol (A) and alcohol (B) with a polyhydric alcohol (C) of formula $R''(OH)_m$ to obtain said magnesium alkoxide compound. Preferred polyhydric alcohols, if used, are alcohols, wherein R'' is a straight-chain, cyclic or branched $C_2$ to $C_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal compound of Group 4 to 6 as defined in IUPAC version 2013 is preferably a titanium compound, most preferably a titanium halide, like $TiCl_4$.

The non-phthalic internal donor (ID) used in the preparation of the catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives of any of them and/or mixtures of any of them. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion—solidification method may be washed at least once, preferably at least twice, most preferably at least three times. The washing can take place with an aromatic and/or aliphatic hydrocarbon, preferably with toluene, heptane or pentane. Washing is also possible with $TiCl_4$ optionally combined with the aromatic and/or aliphatic hydrocarbon. Washing liquids can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained Ziegler-Natta catalyst is desirably obtained in the form of particles having generally an average particle size range of 5 to 200 μm, preferably 10 to 100 μm. The particles generally are compact with low porosity and generally have a surface area below 20 $g/m^2$, more preferably below 10 $g/m^2$. Typically the amount of Ti present in the catalyst is in the range of 1 to 6 wt %, the amount of Mg is in the range of 10 to 20 wt % and the amount of internal donor present in the catalyst is in the range of 10 to 40 wt % of the catalyst composition. A detailed description of the preparation of the catalysts used in the present invention is disclosed in WO 2012/007430, EP2610271 and EP2610272 which are incorporated here by reference.

An external donor (ED) is preferably present as a further component in the polymerization process. Suitable external donors (ED) include certain silanes, ethers, esters, amines, ketones, heterocyclic compounds and blends of these. It is especially preferred to use a silane. It is most preferred to use silanes of the general formula (III)

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (III) are $(tert-butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$. Another most preferred silane is according to the general formula (IV)

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

In addition to the Ziegler-Natta catalyst and the optional external donor (ED) a co-catalyst can be used. The co-catalyst is preferably a compound of group 13 of the periodic table (IUPAC, version 2013), such as for example an aluminum compound e.g. an organo aluminum or aluminium halide compound. An example of a suitable organo aluminium compound is an aluminum alkyl or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally the ratio between the co-catalyst (Co) and the external donor (ED) [Co/ED] and/or the ratio between the co-catalyst (Co) and the transition metal (TM) [Co/TM] is carefully chosen for each process. The ratio between the co-catalyst (Co) and the external donor (ED), [Co/ED] can suitably be in the range of 3.0 to 45.0 mol/mol, preferably in the range of 4.0 to 35.0 mol/mol, more preferably in the range of 5.0 to 30.0 mol/mol. A suitable lower limit can be 3.0 mol/mol, preferably 4.0 mol/mol, more preferably 5.0 mol/mol. A suitable upper limit can be 45.0 mol/mol, preferably 35.0 mol/mol, more preferably 30.0 mol/mol. The lower and upper indicated values of the ranges are included.

The ratio between the co-catalyst (Co) and the transition metal (TM), [Co/TM] can suitably be in the range of 40.0 to 500 mol/mol, preferably in the range of 50.0 to 400 mol/mol, more preferably in the range of 60.0 to 350 mol/mol. A suitable lower limit can be 40.0 mol/mol, preferably 50.0 mol/mol, more preferably 60.0 mol/mol. A suitable upper limit can be 500 mol/mol, preferably 400 mol/mol, more preferably 350 mol/mol. The lower and upper indicated values of the ranges are included.

The present invention also provides a process for producing a propylene homopolymer or copolymer according to the present invention where such propylene homopolymer or copolymer is produced in a polymerization process in the presence of a catalyst system comprising: a) a Ziegler-Natta based catalyst with a transition metal of Group 4 to 6 (TM), the catalyst containing an internal donor, b) optionally a co-catalyst (Co), c) optionally an external donor (ED) and wherein if present, the co-catalyst (Co) to external donor (ED) molar ratio [Co/ED] is in the range of 3.0 to 45.0 mol/mol and wherein the co-catalyst (Co) to transition metal of Group 4 to 6 (TM) molar ratio [Co/TM] is in the range of 40.0 to 500 mol/mol; characterized in that the internal donor comprised in the Ziegler-Natta catalyst (a) is a non-phthalic compound.

For the catalyst system and the compounds comprised in such catalyst system, reference is made to what has been previously described.

The present invention provides next to the propylene homopolymer or copolymer as described above also a polypropylene composition comprising the propylene homopolymer and/or copolymer according to the present invention and at least one or more additives, characterized in that the polypropylene composition is free of phthalic compound. Illustrative additives to be used in the polypropylene composition of the present invention include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer-Tropsch waxes, montan-based waxes, fluoro-based compounds, or paraffin waxes), nucleating agents (for example talc, benzoates, phosphorous-based compounds, sorbitoles, nonitol-based compounds or amide-based compounds), as well as slip and antiblocking agents (for example erucamide, oleamide, talc natural silica and synthetic silica or zeolites) and mixtures thereof.

Generally the total amount of additives in the polypropylene composition is not more than 5.0 wt %, preferably not more than 1.0 wt %, like in the range of 0.005 to 0.995 wt %, more preferably not more than 0.8 wt %, based on the total weight of the polypropylene composition.

The present invention also provides a process for producing a polypropylene composition according to the invention wherein the propylene homopolymer and/or copolymer according to the invention is mixed with at least one or more additives. The additives can be introduced into the melt mixing device via a masterbatch for example. The mixing is preferably carried out in a melt mixing device, more preferably in an extruder. The additives can be introduced into the extruder via a side feeder for example.

The present invention further provides a long-chain branched propylene homopolymer or copolymer (b-PP) having a comonomer in the copolymer selected from ethylene, $C_4$-$C_{20}$-alpha olefin and any combination thereof and a comonomer content in the range of 0.1 to 7.0 wt %, characterized in that:

a) the melt flow rate $MFR_2$ (230° C.) of the b-PP is in the range of 6.5 to 25.0 g/10 min as measured according to ISO 1133, b) the F30 melt strength of the b-PP is in the range of 5.0 to 12.0 cN wherein the F30 melt strength of the b-PP is measured according to ISO 16790:2005, c) the xylene hot insoluble (XHU) fraction of the b-PP is less than 0.15 wt % as measured according to EN 579 and d) the b-PP is free of phthalic compound The long-chain branched propylene homopolymer or copolymer is here and hereinafter sometimes also referred to as b-PP. For the comonomer and its content in the (b-PP), reference is made to what has been previously described.

The melt flow rate ($MFR_2$) of a long-chain branched polypropylene homopolymer or copolymer (b-PP) can be in the range of 6.5 to 25.0 g/10 min. The $MFR_2$ of the long-chain branched propylene homopolymer or copolymer (b-PP) is determined according to ISO standard 1133, at a temperature of 230° C. and under a load of 2.16 kg. Irrespective of the exact nature of the long-chain branched propylene homopolymer or copolymer (b-PP) it is preferred that the $MFR_2$ is between 7.0 and 20.0 g/10 min, more preferably the $MFR_2$ is between 7.5 and 18.0 g/10 min. A suitable lower limit can be 6.5 g/10 min, preferably 7.0 g/10 min, more preferably 7.5 g/10 min. A suitable upper limit can be 25.0 g/10 min, preferably 20.0 g/10 min, more preferably 18.0 g/10 min. The lower and upper indicated values of the ranges are included.

Generally the long-chain branched propylene homopolymer or copolymer (b-PP) has a low gel content expressed by the xylene hot insoluble (XHU) fraction measured according to EN 579 of less than 0.15 wt %, preferably of less than 0.10 wt %, more preferably of less than 0.08 wt %.

The F30 melt strength of the long-chain branched propylene homopolymer or copolymer (b-PP) is measured according to ISO 16790:2005 and is in the range of 5.0 to 12.0 cN, preferably in the range of 5.2 to 11.0 cN, more preferably in the range of 5.4 to 10.5 cN. A suitable lower limit can be 5.0 cN, preferably 5.2 cN, more preferably 5.4 cN. A suitable upper limit can be 12.0 cN, preferably 11.0 cN, more preferably 10.5 cN. The lower and upper indicated values of the F30 melt strength ranges are included.

It is preferred that the long-chain branched propylene homopolymer or copolymer (b-PP) has a v30 melt extensibility measured according to ISO 16790:2005, of equal to or more than 200 mm/s, preferably in the range of 210 to 500 mm/s, more preferably in the range of 220 to 400 mm/s. A suitable lower limit can be 200 mm/s, preferably 210 mm/s, more preferably 220 mm/s. A suitable upper limit can be 500 mm/s, preferably 400 mm/s. The lower and upper indicated values of the v30 melt extensibility ranges are included.

The long-chain branched propylene homopolymer or copolymer (b-PP) according to the present invention is preferably selected from:

a) the group of long-chain branched propylene homopolymers having a melting point of 159 to 170° C., preferably of 161 to 167° C., as determined by differential scanning calorimetry (DSC) in accordance to ISO 11357 or b) the group of long-chain branched propylene copolymers having a melting point of 135 to 161° C., preferably of 136 to 158° C., as determined by differential scanning calorimetry (DSC) in accordance to ISO 11357 or c) blends of (a) and (b).

The long-chain branched propylene homopolymer or copolymer (b-PP) according to the present invention is generally produced by a reactive modification of at least one propylene homopolymer and/or copolymer according to the present invention. This reactive modification process is also part of the present invention. The reactive modification for producing the long-chain branched propylene homopolymer or copolymer (b-PP) according to the present invention is preferably performed by a reaction of the propylene homopolymer and/or copolymer with a thermally decomposing free radical-forming agent and optionally with functionally unsaturated compound chosen from:

a) at least one bifunctionally unsaturated monomer and/or polymer or b) at least one multifunctionally unsaturated monomer and/or polymer or c) a mixture of (a) and (b).

Peroxides are the preferred thermally decomposing free radical-forming agents. More preferably the thermally decomposing free radical-forming agent is selected from the group comprising acyl peroxide, alkyl peroxide, hydroperoxide, perester and peroxycarbonate. Most preferably the thermally decomposing free radical-forming agent is selected from the group preferably consisting of acyl peroxide, alkyl peroxide, hydroperoxide, perester and peroxycarbonate. The following acyl peroxides (ACPER) are particularly preferred: benzoyl peroxide, 4-chlorobenzoyl peroxide, 3-methoxybenzoyl peroxide and/or methyl benzoyl peroxide. Particularly preferred examples of alkyl peroxides (ALPER) are allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide. Particularly preferred examples of peresters and peroxy carbonates (PER) are butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical-forming agents. So for example the following combinations are possible:
  i) ACPER and ALPER
  ii) ACPER and PER
  iii) ALPER and PER
  iv) ACPER and ALPER and PER In the reactive modification for producing a long-chain branched propylene homopolymer or copolymer (b-PP) according to the present invention, the propylene homopolymer and/or copolymer is suitably mixed with 0.25 to 1.00 parts per weight (ppw) of peroxide per 100 parts per weight of propylene homopolymer and/or copolymer, preferably mixed with 0.30 to 0.90 parts per weight (ppw) of peroxide per 100 parts per weight of propylene homopolymer and/or copolymer, more preferably in the presence of 0.35 to 0.85 parts per weight (ppw) of peroxide per 100 parts per weight of propylene homopolymer and/or copolymer. In a preferred way of working the propylene homopolymer and/or copolymer is suitably mixed with 0.25 to 1.00 parts per weight (ppw) of acyl peroxide, alkyl peroxide, hydro peroxide, per-ester and/or per-oxycarbonate per 100 parts per weight of propylene homopolymer and/or copolymer, preferably mixed with 0.25 to 1.00 parts per weight (ppw) of acyl peroxide, alkyl peroxide, per-ester and/or peroxycarbonate per 100 parts per weight of propylene homopolymer and/or copolymer, more preferably mixed with 0.25 to 1.00 parts per weight (ppw) of tert-butylperoxy isopropyl carbonate (CAS No. 2372-21-6) per 100 parts per weight of propylene homopolymer and/or copolymer. Tert-butylperoxy isopropyl carbonate (CAS No. 2372-21-6) is commercially available as Trigonox® BPIC-C75 (Akzo Nobel, NL). The amount of peroxide is calculated based on the sum of all mixed propylene homopolymer and/or copolymer.

"Bifunctionally unsaturated or multifunctionally unsaturated" as used above means the presence of respectively two or more non-aromatic double bonds. Only those bifunctionally or multifunctionally unsaturated compounds are used which can be polymerized with the aid of free radicals. Suitable examples are divinylbenzene or cyclopentadiene or polybutadiene. Preferably the bifunctionally unsaturated monomers are chosen from:
  divinyl compounds, such as for example divinylaniline, m-divinylbenzene, p-divinylbenzene, divinylpentane and divinylpropane;
  allyl compounds, such as for example allyl acrylate, allyl methacrylate, allyl methyl maleate and allyl vinyl ether;
  dienes, such as for example 1,3-butadiene, chloroprene, cyclohexadiene, cyclopentadiene, 2,3-dimethylbutadiene, heptadiene, hexadiene, isoprene and 1,4-pentadiene;
  aromatic and/or aliphatic bis (maleimide) bis (citraconimide);
  and mixtures of any of these unsaturated monomers.

Especially preferred bifunctionally unsaturated monomers are 1,3-butadiene, isoprene, dimethyl butadiene and divinylbenzene. The bifunctionally unsaturated polymer is preferably a polymer comprising at least one of the above mentioned bifunctionally unsaturated monomers. The multifunctionally unsaturated polymer contains more than one unsaturated monomer as described above. Examples of such polymers including oligomers are
  polybutadienes, especially where the different microstructures in the polymer chain, i.e. 1,4-cis, 1,4-trans and 1,2-(vinyl) are predominantly in the 1,2-(vinyl) configuration,
  copolymers of butadiene and styrene having the 1,2-(vinyl) configuration in the polymer chain.

A preferred polymer is polybutadiene, in particular a polybutadiene having more than 50.0 wt % of the butadiene in the 1,2-(vinyl) configuration. The 1,2-(vinyl) configuration is determined by $^1$H and $^{13}$C NMR spectroscopy.

According to the invention, optionally at least one functionally unsaturated compound is used next to the peroxide. Usually not more than three different functionally unsaturated compounds are used; preferably one functionally unsaturated compound is used. The term "functionally unsaturated compound" denotes the functionally unsaturated compounds that have been previously defined.

Generally the functionally unsaturated compound can be used in a concentration of 0.4 to 2.5 parts per weight (ppw) of functionally unsaturated compound per 100 parts per weight of propylene homopolymer and/or copolymer, preferably in a concentration of 0.5 to 2.2 parts per weight (ppw) of functionally unsaturated compound per 100 parts per weight of propylene homopolymer and/or copolymer, more preferably in a concentration of 0.7 to 2.0 parts per weight (ppw) of functionally unsaturated compound per 100 parts per weight of propylene homopolymer and/or copolymer. In a preferred way of working the propylene homopolymer and/or copolymer is suitably mixed with 0.4 to 2.5 parts per weight (ppw) of bifunctionally unsaturated monomer and/or bifunctionally unsaturated polymer and/or multifunctionally unsaturated monomer and/or multifunctionally unsaturated polymer, per 100 parts per weight of propylene homopolymer and/or copolymer. More preferably, the propylene homopolymer and/or copolymer is mixed with 0.4 to 2.5 parts per weight (ppw) of bifunctionally unsaturated monomer and/or multifunctionally unsaturated polymer, per 100 parts per weight of propylene homopolymer and/or copolymer. Most preferably it is mixed with 0.4 to 2.5 parts per weight (ppw) of 1,3-butadiene, isoprene, dimethyl butadiene, divinylbenzene, polybutadiene and/or mixture of any of them, per 100 parts per weight of propylene homopolymer and/or copolymer. The amount of functionally unsaturated compound is calculated based on the sum of all mixed propylene homopolymer and/or copolymer.

The present invention further provides a reactive modification process for producing a long-chain branched propylene homopolymer or copolymer (b-PP) according to the invention, comprising the steps: mixing a propylene homopolymer and/or copolymer according to the invention, with a thermally decomposing free radical-forming agent and optionally with at least one functionally unsaturated compound at a temperature of 20 to 100° C. for at least 2 minutes to form a pre-mixed material and melt mixing the pre-mixed material in a melt mixing device at a barrel temperature in the range of 180 to 300° C.

Unless explicitly stated to the contrary in the following the term "propylene homopolymer and/or copolymer" denotes the polymer material that has been previously defined. Unless explicitly stated to the contrary in the following the term "functionally unsaturated compound" denotes a compound that has been previously defined.

It should be understood that when both a peroxide and a functionally unsaturated compound are used, they can be added in each situation together or separately in one or more portions. When they are added together they can be added at once in the pre-mixing stage for example. When the peroxide and the functionally unsaturated compound are added separately they each can be split over two or more additions. For example: a first addition in a pre-mixing stage and a second addition in a melt-mixing stage. However other addition schemes are also possible. Complete addition of the functionally unsaturated compound and the peroxide in a pre-mixing stage is preferred.

Optionally, the functionally unsaturated compound is added and mixed in the form of a masterbatch composition.

The propylene homopolymer and/or copolymer can be pre-mixed with the functionally unsaturated compound and peroxide in a powder mixing device, like for example a horizontal mixer with paddle stirrer. The pre-mixing is usually carried out at a temperature of 20 to 100° C., preferably at a temperature of the polymer powder of 30 to 90° C., most preferably in the range of 40 to 80° C. The residence time of the propylene homopolymer and/or copolymer in the pre-mixing step is usually at least 2 minutes, preferably in the range of 5 to 30 minutes, more preferably in the range of 8 to 20 minutes. Following the pre-mixing step, the pre-mixed material is then melt mixed at a barrel temperature in the range of 180 to 300° C., which is not necessarily constant over the complete melt-mixing process. The barrel temperature is preferably in the range of 200 to 280° C. The pre-mixed material is preferably melt-mixed in a continuous melt mixing device like for example a single screw extruder, a co-rotating twin screw extruder or a co-rotating kneader. Preferably, the melt mixing device includes a feed zone, a kneading zone and a die zone. More preferably, a specific temperature profile is maintained along the screw of the melt-mixing device, having an initial temperature T1 in the feed zone, a maximum temperature T2 in the kneading zone and a final temperature T3 in the die zone, all temperatures being defined as barrel temperatures. Barrel temperature T1 (in the feed zone) is preferably in the range of 180 to 260° C. Barrel temperature T2 (in the kneading zone) is preferably in the range of 260 to 300° C. Barrel temperature T3 (in the die zone) is preferably in the range of 220 to 280° C. The screw speed of the melt mixing device can be adjusted depending on the material characteristics. The man skilled in the art is well familiar with this and can easily determine the appropriate screw speed. Generally the screw speed can be adjusted to a range from 100 to 750 rotations per minute (rpm), preferably to a range from 150 to 650 rotations per minute (rpm). Following the melt-mixing step, the resulting long-chain branched propylene homopolymer or copolymer melt can be pelletized, for example in an underwater pelletizer or after solidification of one or more strands in a water bath, in a strand pelletizer.

The present invention is further concerned with a long-chain branched polypropylene composition (b-PP-C) comprising a long-chain branched propylene homopolymer and/or copolymer (b-PP) according to the invention and at least one or more other compounds chosen from additives and polymers, characterized in that such long-chain branched polypropylene composition has a) a melt flow rate $MFR_2$ (230° C.) in the range of 6.5 to 25.0 g/10 min as measured according to ISO 1133,
b) a F30 melt strength in the range of 5.0 to 12.0 cN, wherein the F30 melt strength is measured according to ISO 16790:2005,
c) a xylene hot insoluble (XHU) of less than 0.15 wt % as measured according to EN 579,
d) an OCS value of less than 2000, and measured according to the method described herein and
e) the long-chain branched polypropylene composition (b-PP-C) is free of phthalic compound.

The present invention is preferably concerned with a long-chain branched polypropylene composition (b-PP-C) consisting of a long-chain branched propylene homopolymer and/or copolymer (b-PP) according to the invention and at least one or more other compounds chosen from: additives and/or polymers characterized in that such long-chain branched polypropylene composition (b-PP-C) has:

a) a melt flow rate $MFR_2$ (230° C.) in the range of 6.5 to 25.0 g/10 min as measured according to ISO 1133,
b) a F30 melt strength in the range of 5.0 to 12.0 cN, wherein the F30 melt strength is measured according to ISO 16790:2005,
c) a xylene hot insoluble (XHU) of less than 0.15 wt % as measured according to EN 579,
d) an OCS value of less than 2000, and measured according to the method described herein and
e) the long-chain branched polypropylene composition (b-PP-C) is free of phthalic compound.

This composition therefore does not contain fillers and/or reinforcement agents.

For the types of additives comprised in the long-chain branched polypropylene composition (b-PP-C) according to the invention, reference is made to what has been previously described. Polymers to be used in the long-chain branched polypropylene composition (b-PP-C) according to the invention preferably include thermoplastic polymers. Preferably the total amount of additives, polymers and/or combinations of thereof in the long-chain branched polypropylene composition (b-PP-C) according to the invention is not more than 5.0 wt %, more preferably not more than 1.0 wt %, like in the range of 0.005 to 0.995 wt %, based on the total weight of the long-chain branched polypropylene composition (b-PP-C) according to the invention.

The melt flow rate ($MFR_2$) of an inventive long-chain branched polypropylene composition (b-PP-C) is in the range of 6.5 to 25.0 g/10 min. Preferably, the $MFR_2$ for said long-chain branched polypropylene composition (b-PP-C) is in the range of 7.0 and 20.0 g/10 min, more preferably in the range of 7.5 to 18.0 g/10 min. The $MFR_2$ for the long-chain branched polypropylene composition (b-PP-C) is determined according to ISO standard 1133, at a temperature of 230° C. and under a load of 2.16 kg. A suitable lower limit can be 6.5 g/10 min, preferably 7.0 g/10 min, more preferably 7.5 g/10 min. A suitable upper limit can be 25.0 g/10 min, preferably 20.0 g/10 min, more preferably 18.0 g/10 min. The lower and upper indicated values of the $MFR_2$ ranges are included.

Generally the long-chain branched polypropylene composition (b-PP-C) according to the invention has a low gel content expressed by the xylene hot insoluble (XHU) fraction measured according to EN 579 of less than 0.15 wt %, preferably of less than 0.10 wt %, more preferably of less than 0.08 wt %.

The F30 melt strength of the long-chain branched polypropylene composition (b-PP-C) according to the invention is measured according to ISO 16790:2005 and is in the range of 5.0 to 12.0 cN, preferably in the range of 5.2 to 11.0 cN, more preferably in the range of 5.4 to 10.5 cN. A suitable lower limit can be 5.0 cN, preferably 5.2 cN, more preferably 5.4 cN. A suitable upper limit can be 12.0 cN, preferably 11.0 cN, more preferably 10.5 cN. The lower and upper indicated values of the F30 melt strength ranges are included.

The gel index value of the long-chain branched polypropylene composition (b-PP-C) is measured with an Optical Control System (OCS) method on extrusion cast films as described in the method section and is typically less than 2000, preferably less than 1700, more preferably less than 1500.

It is preferred that the long-chain branched polypropylene composition (b-PP-C) has a v30 melt extensibility measured according to ISO 16790:2005, of equal to or more than 200 mm/s, preferably in the range of 210 to 500 mm/s, more preferably in the range of 220 to 400 mm/s. A suitable lower limit can be 200 mm/s, preferably 210 mm/s, more preferably 220 mm/s. A suitable upper limit can be 500 mm/s, preferably 400 mm/s. The lower and upper indicated values of the v30 melt extensibility ranges are included.

It is preferred that the final long-chain branched polypropylene composition (b-PP-C) fulfils the same requirements as its respective long-chain branched propylene homopolymer or copolymer (b-PP) regarding the following features: $MFR_2$, F30 melt strength, XHU, v30 melt extensibility and being free of phthalic compound.

In the present invention, the long-chain branched polypropylene composition (b-PP-C) can further comprise fillers and/or reinforcement agents. Fillers to be used in the long-chain branched polypropylene composition (b-PP-C) according to the invention include, but are not limited to talc, calcium carbonate, calcium sulphate, clay, kaolin, silica, glass, fumed silica, mica, wollastonite, feldspar, aluminium silicate, calcium silicate, alumina, hydrated alumina such as alumina trihydrate, glass microsphere, ceramic microsphere, wood flour, marble dust, magnesium oxide, magnesium hydroxide, antimony oxide, zinc oxide, barium sulphate and/or titanium dioxide. Reinforcement agents to be used in the long-chain branched polypropylene composition (b-PP-C) according to the invention include, but are not limited to mineral fibers, glass fibers, carbon fibers, organic fibers and/or polymer fibers. Preferably the total amount of additives, polymers, fillers, reinforcement agents and/or combinations thereof in the long-chain branched polypropylene composition (b-PP-C) according to the invention is not more than 5.0 wt %, more preferably not more than 1.0 wt %, like in the range of 0.005 to 0.995 wt %, based on the total weight of the long-chain branched polypropylene composition (b-PP-C) according to the invention.

The present invention also provides a process for producing a long-chain branched polypropylene composition according to the invention wherein the long-chain branched propylene homopolymer and/or copolymer (b-PP) according to the invention is mixed with at least one or more compounds chosen from additives, polymers, fillers, reinforcement agents and any combination of them. The compounds chosen from additives, polymers, fillers and/or reinforcement agents can be introduced into the melt mixing device via a masterbatch for example. The mixing is preferably carried out in a melt mixing device, more preferably in an extruder. The compounds can be introduced into the extruder via a side feeder for example.

The present invention also provides an article made from
a) a long-chain branched propylene homopolymer and/or copolymer (b-PP) according to the present invention and/or
b) a long-chain branched polypropylene composition (b-PP-C) according to the present invention.

Suitable articles made from a long-chain branched propylene homopolymer and/or copolymer (b-PP) according to the present invention and/or a long-chain branched polypropylene composition (b-PP-C) according to the present invention are for example toys, grips, handles, floorings, wheels, furniture and appliance feet, hoses, office supplies, tubes, lids, caps, kitchen wares, pipes, fibres, tapes or films. A preferred article made from a long-chain branched propylene homopolymer and/or copolymer (b-PP) and/or a long-chain branched polypropylene composition (b-PP-C) according to the present invention is a film, for example a biaxially oriented film.

The invention further provides a melt-state transformation process for producing an article, preferably a film, comprising a long-chain branched propylene homopolymer and/or copolymer (b-PP) according to the invention and/or a long-chain branched polypropylene composition according to the invention.

The preparation of the film is accomplished through techniques known in the art. For instance, the film can be produced by cast film or blown film technology. In the cast film technology the molten long-chain branched propylene homopolymer and/or copolymer (b-PP) and/or the long-chain branched polypropylene composition (b-PP-C) are/is extruded through a slot extrusion die onto a chill roll to cool the polymer to a solid film. Typically the long-chain branched propylene homopolymer and/or copolymer (b-PP) and/or the long-chain branched polypropylene composition (b-PP-C) are/is firstly compressed and melted in an extruder, it being possible for any additives to be already added to the polymer or introduced at this stage via a masterbatch. The melt is then forced through a flat-film die (slot die) and the extruded film is taken off on one or more take-off rolls, during which it cools and solidifies. It has proven particularly favorable to keep the take-off roll or rolls, by means of which the extruded film is cooled and solidified, at a temperature from 10 to 50° C., preferably from 10 to 40° C., more preferably from 12 to 35° C. The obtained product is an unstretched film which can be if desired, stretched in one or two directions.

In the blown film process the long-chain branched propylene homopolymer and/or copolymer (b-PP) and/or the long-chain branched polypropylene composition (b-PP-C)

are/is extruded through an annular die and blown into a tubular film by forming a bubble which is collapsed between nip rollers after solidification. The blown extrusion can be preferably effected at a temperature in the range 160 to 240° C. Cooling can be effected by water or preferably by blowing gas (generally air) at a temperature of 10 to 50° C. to provide a frost line height of 0.5 to 8 times the diameter of the die. The blow up ratio should generally be in the range of from 1.5 to 4, such as for example from 2 to 4, preferably 2.5 to 3.5.

Finally the present invention is also directed to the use of the long-chain branched propylene homopolymer and/or copolymer (b-PP) and/or of the long-chain branched polypropylene composition (b-PP-C) according to the invention for producing articles, preferably a film.

EXAMPLES

I. Measuring Methods

The following definitions of terms and determination methods apply for the above general description of the invention as well as to the below examples, unless otherwise defined.

a) Particle Size/Particle Size Distribution

A sieve analysis according to ISO 3310 was performed on the polymer samples. The sieve analysis involved a nested column of sieves with wire mesh screen with the following sizes: >20 μm, >32 μm, >63 μm, >100 μm, >125 μm, >160 μm, >200 μm, >250 μm, >315 μm, >400 μm, >500 μm, >710 μm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve. The particle size distribution and the characteristic median particle size d50 as well as the top-cut particle size d95 were determined from the results of the sieve analysis according to ISO 9276-2.

b) Comonomer Content

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and was quantitatively needed for accurate ethylene content quantification. Standard single-pulse excitation was employed without Nuclear Overhauser Effect (NOE), using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using computer programs. All chemical shifts were indirectly referenced to the central methylene group of the ethylene block (EEE) at 30.00 ppm using the chemical shift of the solvent. This approach allowed comparable referencing, even when this structural unit was not present. Characteristic signals corresponding to the incorporation of ethylene were observed as described in Cheng, H. N., Macromolecules 17 (1984), 1950). With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33, 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to be present. This approach reduced the overestimation of ethylene content for such systems and was achieved by reduction of the number of sites used to determine the absolute ethylene content to:

$$E = 0.5(S_{\beta\beta} + S_{\beta\gamma} + S_{\beta\delta} + 0.5(S_{\alpha\beta} + S_{\alpha\gamma}))$$

Through the use of this set of sites the corresponding integral equation becomes:

$$E = 0.5(I_H + I_G + 0.5(I_C + I_D))$$

using the same notation as used in the article of Wang et. al. (Wang, W-J., Zhu, S., Macromolecules 33 (2000), 1157). Equations used for absolute propylene content were not modified. The mole percent comonomer incorporation was calculated from the mole fraction:

$$E \,[\text{mol \%}] = 100 * fE$$

The weight percent comonomer incorporation was calculated from the mole fraction:

$$E[\text{wt \%}] = 100 * (fE * 28.06) / ((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \qquad (I)$$

wherein
I(E) is the relative content of isolated to block ethylene sequences [in %];
fPEP is the mole fraction of propylene/ethylene/propylene sequences (PEP) in the sample;
fPEE is the mole fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample.

c) Xylene Cold Soluble Fraction (XCS, Wt %)

The amount of the polymer soluble in xylene is determined at 25.0° C. according to ISO 16152; $5^{th}$ edition; 2005-Jul.-1.

d) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

e) $F_{30}$ Melt Strength and $v_{30}$ Melt Extensibility

The test described herein follows ISO 16790:2005. The strain hardening behaviour is determined by the method as described in the article "Rheotens-Mastercurves and Drawability of Polymer Melts", M. H. Wagner, Polymer Engineering and Sience, Vol. 36, pages 925 to 935. The strain hardening behaviour of polymers is analysed with a Rheotens apparatus (product of Göttfert, Siemensstr. 2, 74711 Buchen, Germany) in which a melt strand is elongated by drawing down with a defined acceleration. The Rheotens experiment simulates industrial spinning and extrusion processes. In principle a melt is pressed or extruded through a round die and the resulting strand is hauled off. The stress on the extrudate is recorded as a function of melt properties and measuring parameters (especially the ratio between output and haul-off speed, practically a measure for the extension rate).

For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero). Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec². The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

f) XHU Fraction. Gel Content

The xylene hot insoluble (XHU) fraction is determined according to EN 579. About 2.0 g of the polymer ($m_p$) are weighted and put in a mesh of metal which is weighted, the total weight being represented by ($m_{p+m}$). The polymer in the mesh is extracted in a soxhlet apparatus with boiling xylene for 5 hours. The eluent is then replaced by fresh xylene and boiling is continued for another hour. Subsequently, the mesh is dried and weighted again ($m_{XHU+m}$). The mass of the xylene hot insoluble ($m_{XHU}$) obtained by the formula $m_{XHU+m} - m_m = m_{XHU}$ is put in relation to the weight of the polymer ($m_p$) to obtain the fraction of xylene insolubles $m_{XHU}/m_p$.

g) Melting Temperature

The melting temperature, $T_m$, is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The melting temperature ($T_m$) being determined in the second heating step.

h) Porosity and Specific Pore Volume

The porosity and the specific pore volume of the polymer are measured by mercury porosimetry according to DIN 66133 in combination with helium density measurement according to DIN 66137-2. The samples were first dried for 3 hours at 70° C. in a heating cabinet, then stored in an exsiccator until the measurement. The pure density of the samples was determined on milled powder using helium at 25° C. in a Quantachrome Ultrapyknometer 1000-T (DIN 66137-2). Mercury porosimetry was performed on non-milled powder in a Quantachrome Poremaster 60-GT in line with DIN 66133.

The porosity is calculated by equation (II):

$$\text{Porosity } [\%] = \left[\frac{\text{specific pore volume}}{\left(\text{specific pore volume} + \frac{1}{\text{density}}\right)}\right] * 100 \qquad (II)$$

i) Optical Control System (OCS) Gel Index i1. Apparatus

The apparatus consists of a laboratory extruder ME 25/5200 V1 with three heating zones, an adapter and a 150 mm broad die. The follow-on unit encompasses a chillroll CR-8, diameter 140 mm, including Haake C40P heating- and cooling device (15 to 90° C.), a line scan camera FS-5/4096 Pixel (dynamical digital converting of gray scale images) and a wind-up unit with automatic tension control up to 10 N.

i2. Material-Specific Settings for Film-Manufacturing

The temperature setting for the heating zones at cylinder and die is classified for polypropylene according to MFR-ranges in three groups:

Group 1: When the MFR of the polypropylene is in the range of 0.3 to 2.0 g/10 min (230° C./2.16 kg), then the temperature settings for heating zones are 220/260/270/280/290° C.

Group 2: When the MFR of the polypropylene is in the range of 2.0 to 10 g/10 min (230° C./2.16 kg), then the temperature settings for heating zones are 220/230/240/250/260° C.

Group 3: When the MFR of the polypropylene is in the range of 10 to 33 g/10 min (230° C./2.16 kg), then the temperature settings for heating zones are 200/220/230/240/240° C.

Preset Parameters:
Rotational speed (screw): 30 rpm
Haul-off speed: 3 m/min;
The film thickness is 50 μm i3. Measurement The measurement starts: a) After ca. 60 min running-in period, in case of similar materials or b) after ca. 120 min running-in period, in case of highly diverging materials.

Goal: Adjustment of a homogenous film at constant melt pressure and melt temperature. The measuring area is standardized at 5 m². The measurement itself is terminated automatically when the area is accomplished. The report will be printed simultaneously.

i4. Analysis

The average number of gel dots on a film surface of 1/m² is detected by the line camera. The line camera is set to differentiate the gel dot size according to the following table.

| Gel dot size class | Gel dot size | Calculating factor |
|---|---|---|
| Size class 1 | 100-300 μm | mass factor × 0.1 |
| Size class 2 | 301-600 μm | mass factor × 1.0 |
| Size class 3 | 601-1000 μm | mass factor × 5.0 |
| Size class 4 | >1000 μm | mass factor × 10 |

The number of gel dots detected for each size is multiplied with its respective calculating factor. The sum of all those values gives one final value which is called the optical gel index.

i5 Example

| | | |
|---|---|---|
| 17 defects size class 1 | ×0.1 | = 1.7 |
| 5 defects size class 2 | ×1.0 | = 5.0 |
| 2 defects size class 3 | ×5.0 | = 10.0 |
| 0 defects size class 4 | ×10.0 | = 0 |

Gel index = 16.7

II Inventive and Comparative Examples a) Catalyst Preparation 3.4 liter of 2-ethylhexanol and 810 ml of propylene glycol butyl mono-ether (in a molar ratio 4/1) were added to a 20 l reactor. Then 7.8 liter of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of the Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25° C., after which the reactor temperature was raised to 90° C. within 30 minutes. The reaction mixture was stirred for a further 30 minutes at 90° C. Afterwards stirring was stopped and the reaction mixture was allowed to settle for 15 minutes at 90° C. The solid material was washed 5 times: washings were made at 80° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane during 10 minutes of stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder.

b) Polymerization

Inventive examples IE1 and IE2 were produced in a pilot plant with a prepolymerization reactor, one slurry loop reactor and one gas phase reactor. The solid catalyst component described above was used for the inventive examples IE1 and IE2 along with triethyl-aluminium (TEAL) as co-catalyst and dicyclo pentyl dimethoxy silane (D-donor) as external donor. The co-catalyst to donor ratio, the co-catalyst to titanium ratio and the polymerization conditions are indicated in Table 1. The comparative example CE1 is a polypropylene homopolymer based on a $3^{rd}$ generation Ziegler-Natta catalyst without internal donor and using methyl methacrylate as external donor.

TABLE 1

Polymerization and polymer properties

| | | IE1 | IE2 | CE1 |
|---|---|---|---|---|
| Polymerization | | | | |
| Co/ED ratio | mol/mol | 20.1 | 20.1 | |
| Co/Ti ratio | mol/mol | 70.4 | 367.6 | |
| Loop (Reactor 1) | | | | |
| Time | h | 0.5 | 0.5 | |
| Temperature | ° C. | 75 | 75 | |
| $MFR_2$ | g/10 min | 5.1 | 5.3 | |
| XCS | wt.-% | 2.1 | 2.0 | |
| $C_2$ content | wt.-% | 0.6 | 0.0 | |
| $H_2/C_3$ ratio | mol/kmol | 1.1 | 1.1 | |
| $C_2/C_3$ ratio | mol/kmol | 1.3 | 0 | |
| amount | wt.-% | 44 | 43 | |
| GPR (Reactor 2) | | | | |
| Time | h | 2.0 | 2.0 | |
| Temperature | ° C. | 80 | 80 | |
| Pressure | kPa | 2600 | 2600 | |
| $MFR_2$ | g/10 min | 3.9 | 6.2 | |
| $C_2$ content | wt.-% | 0.5 | 0.0 | |
| $H_2/C_3$ ratio | mol/kmol | 10.5 | 15.7 | |
| $C_2/C_3$ ratio | mol/kmol | 0.6 | 0.0 | |
| amount | wt.-% | 56 | 57 | |
| Powder properties | | | | |
| porosity | % | 11.5 | 11.5 | 7.7 |
| specific pore volume | cm³/g | 0.155 | 0.155 | 0.1 |
| median particle size d50 | μm | 320 | 510 | 420 |
| top-cut particle size d95 | μm | 790 | 820 | 1130 |
| Polymer properties | | | | |
| Ethylene content | wt % | 0.5 | 0.0 | 0.0 |
| I(E) content | % | 62.5 | — | — |
| XCS | wt % | 2.3 | 1.7 | 3.0 |
| $MFR_2$ | g/10 min | 3.2 | 5.8 | 3.0 |
| $T_m$(DSC) | ° C. | 159 | 164 | 163 |

From Table 1 it can be derived that the comparative example (CE1) does not fulfil the requirements for porosity and specific pore volume needed for the inventive material.

The reactive modification of the polymer powders described in Table 1 was performed in line with the process description of EP 2520425, as already mentioned before. Both the butadiene (BD) and the peroxide (PDX) were pre-mixed with the polymer powder prior to the melt-mixing step in a horizontal mixer with paddle stirrer at a temperature of 65° C., maintaining an average residence time of 15 minutes. The amount of BD and PDX is based on the total amount of propylene homopolymer and/or copolymer. The pre-mixture was transferred under inert atmosphere to a co-rotating twin screw extruder of the type Theyson TSK60 having a barrel diameter of 60 mm and an L/D-ratio of 48 equipped with a high intensity mixing screw having three kneading zones and a two-step degassing setup. A melt temperature profile with initial temperature T1=240° C. in the feed zone, maximum temperature T2=280° C. in the last kneading zone and a final temperature T3=230° C. in the die zone, all temperatures being defined as barrel temperatures, was selected. The screw speed was set at 350 rpm.

Following the melt-mixing step, the resulting polymer melt was pelletized after solidification of the strands in a water bath in a strand pelletizer at a water temperature of 40° C. Reaction conditions and properties of the resulting composition are summarized in Table 2.

From Table 2 it can be derived that the polypropylene compositions according to the invention present much lower OCS values than the comparative compositions.

TABLE 2

Reactive modification and composition properties

|  |  | IE3 | IE4 | CE2 | CE3 |
|---|---|---|---|---|---|
| Based Polymer powder | | IE1 | IE2 | CE1 | CE1 |
| Process data | | | | | |
| Screw speed | rpm | 450 | 450 | 450 | 450 |
| Throughput | kg/h | 200 | 200 | 200 | 200 |
| POX Level | wt % | 0.675 | 0.690 | 0.675 | 0.690 |
| BD level | wt % | 1.4 | 1.4 | 1.4 | 1.4 |
| Composition properties | | | | | |
| MFR2 | g/10 min | 10.3 | 16.5 | 9.7 | 11.1 |
| F30 | cN | 7.8 | 6.0 | 9.6 | 7.4 |
| v30 | mm/s | 252 | 264 | 256 | 250 |
| XHU | wt % | 0.03 | 0.04 | 0.12 | 0.09 |
| OCS value | — | 275 | 874 | 4679 | 2424 |

The invention claimed is:

1. A process for producing a long-chain branched propylene homopolymer or copolymer (b-PP), wherein the process comprises:
    producing a propylene homopolymer or copolymer having a comonomer content in the copolymer selected from ethylene, $C_4$-$C_{20}$-alpha olefin and any combination thereof, with a comonomer content in the range of 0.1 to 7.0 wt %, in a polymerization process in the presence of a catalyst system comprising:
    (a) a Ziegler-Natta based catalyst with a transition metal of Group 4 to 6 (TM), the catalyst containing an internal donor,
    (b) optionally a co-catalyst (Co),
    (c) optionally an external donor (ED) and wherein if present, the co-catalyst (Co) to external donor (ED) molar ratio [Co/ED] is in the range of 3.0 to 45.0 mol/mol and wherein the co-catalyst (Co) to transition metal of Group 4 to 6 (TM) molar ratio [Co/TM] is in the range of 40.0 to 500 mol/mol;
    wherein the resulting propylene homopolymer or copolymer powder has:
    (a) a porosity of more than 8.0%,
    (b) a median particle size d50 in the range of 150 to 1500 μm, and
    (c) a top-cut particle size d95 in the range of 500 to 400 μm,
    wherein the internal donor comprised in the Ziegler-Natta catalyst (a) is a non-phthalic compound; and
    mixing said propylene homopolymer or copolymer with a thermally decomposing free radical-forming agent and optionally with at least one functionally unsaturated compound at a temperature of 20 to 100° C. for at least 2 minutes to form a pre-mixed material and melt mixing the premixed material in a melt mixing device at a barrel temperature in the range of 180 to 300° C. to obtain said long-chain branched propylene homopolymer or copolymer (b-PP), wherein the long-chain branched propylene homopolymer or copolymer (b-PP) has:
    (a) a comonomer in the copolymer selected from ethylene, $C_4$-$C_{20}$-alpha olefin and any combination thereof and a comonomer content in the range of 0.1 to 7.0 wt %,
    (b) the melt flow rate $MFR_2$ (230° C.) of the b-PP is in the range of 6.5 to 25.0 g/10 min as measured according to ISO 1133,
    (c) the F30 melt strength of the b-PP is in the range of 5.0 to 12.0 cN wherein the F30 melt strength of the b-PP is measured according to ISO 16790:2005,
    (d) the xylene hot insoluble (XHU) fraction of the b-PP is less than 0.08 wt % as measured according to EN 579, and
    (e) the b-PP is free of phthalic compound.

2. Process according to claim 1, wherein the long-chain branched propylene homopolymer or copolymer (b-PP) has a v30-A melt extensibility of equal to or more than 200 mm/s wherein the v30 melt extensibility is measured according to ISO 16790:2005.

3. Process according to claim 1, wherein the non-phthalic compound is selected from (di)esters of non-phthalic carboxylic (di)acids wherein the (di)ester belongs to the group comprising malonates, maleates, succinates, citraconates, glutarates, cyclohexene-1,2-dicarboxylates and benzoates and derivatives of any of them and/or mixtures of any of them.

4. The process according to claim 1, further comprising the step:
    mixing the long chain-chain branched propylene homopolymer or copolymer (b-PP) with at least one or more compounds chosen from:
    (a) additives,
    (b) polymers,
    (c) fillers,
    (d) reinforcement agents, and
    (e) any combination of (a), (b), (c), and (d),
    for producing a long-chain branch polypropylene composition (b-PP-c).

5. The process according to claim 4, wherein the long-chain branch polypropylene composition (b-PP-c) has:
    (a) a melt flow rate $MFR_2$ (230°C.) in the range of 6.5 to 25.0 g/10min as measured according to ISO 1133,
    (b) an F30 melt strength in the range of 5.0 to 12.0 cN, wherein the F30 melt strength is measured according to ISO 16790:2005, (c) a xylene hot insoluble (XHU) of less than 0.08 wt % as measured according to EN 579,
(d) an OCS value of less than 2000, and measured according to the method described herein, and
(e) the long-chain branched polypropylene composition (b-PP-C) is free of phthalic compound.

* * * * *